US008963397B2

(12) United States Patent
Kuroda et al.

(10) Patent No.: US 8,963,397 B2
(45) Date of Patent: Feb. 24, 2015

(54) BRUSH HOLDER DEVICE OF VEHICLE AC GENERATOR

(75) Inventors: Motokazu Kuroda, Tokyo (JP); Masaki Hinoue, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 300 days.

(21) Appl. No.: 13/599,332

(22) Filed: Aug. 30, 2012

(65) Prior Publication Data
US 2013/0249347 A1 Sep. 26, 2013

(30) Foreign Application Priority Data

Mar. 23, 2012 (JP) ................. 2012-066730

(51) Int. Cl.
*H02K 5/14* (2006.01)
*H02K 11/00* (2006.01)
*H01R 39/38* (2006.01)

(52) U.S. Cl.
USPC ............................ 310/239; 310/242; 310/68 D

(58) Field of Classification Search
CPC ....................................................... H01R 39/38
USPC ................... 310/239, 240, 241, 242, 68 D
See application file for complete search history.

(56) References Cited

U.S. PATENT DOCUMENTS

| 4,859,894 A * | 8/1989 | Akutsu et al. ................. 310/239 |
| 5,245,241 A * | 9/1993 | Gotoh ........................... 310/242 |
| 2003/0107292 A1* | 6/2003 | Kashihara et al. ............ 310/239 |

FOREIGN PATENT DOCUMENTS

| JP | 04-137378 A | 5/1992 |
| WO | 2008-142778 A1 | 11/2008 |

OTHER PUBLICATIONS

Japanese Office Action, issued Sep. 3, 2013, Patent Application No. 2012-066730.

* cited by examiner

*Primary Examiner* — Quyen Leung
*Assistant Examiner* — Thomas Truong
(74) *Attorney, Agent, or Firm* — Sughrue Mion, PLLC

(57) ABSTRACT

A brush holder device of a vehicle AC generator includes: a regulator circuit that adjusts magnitude of an AC voltage generated in a stator; a base that is attached within a rear bracket and formed by integrally molding a brush holder portion having a brush insertion hole and holding a brush within the brush insertion hole and a regulator circuit housing portion in which the regulator circuit is housed and held; a cap that is made of resin and has sufficient elasticity to close the brush insertion hole; and a plate that is made of metal, integrally has the cap made of resin, and is attached to the brush holder portion.

5 Claims, 12 Drawing Sheets

BRUSH HOLDER DEVICE OF VEHICLE AC GENERATOR

BACKGROUND OF THE INVENTION

1. Field of the Invention

The present invention relates to a brush holder device of a vehicle AC generator installed, for example, to an automobile.

2. Background Art

There is a brush holder device of a vehicle AC generator disclosed, for example, in Patent Document 1. This brush holder device includes a brush holder assembly having a base and a plate in order to reduce a circumferential space occupied by a brush holder within a rear bracket and also to reduce water and dust coming inside of a regulator circuit housing portion. The base is manufactured by integrally molding a brush holder portion, the regulator circuit housing portion, and a connector portion. The plate is attached to the brush holder portion and manufactured to have a current plate portion having a flat plane on the surface and a cover portion provided so as to extend upright from the current plate portion and closing a resin inlet of the regulator circuit housing portion.

RELATED ART DOCUMENTS

Patent Document

Patent Document 1: WO 2008/142778A1

The application of the invention is filed by the applicant of Patent Document 1 to overcome the following problems that have been revealed in the implementation of Patent Document 1.

That is, because the plate is made of resin, mechanical strength is poor and depletion of resin occurs when high temperature conditions continue. Accordingly, a fastening torque of fixation screws or the like is deteriorated and fixation becomes insufficient. Consequently, the brush holder device becomes less reliable.

Also, two components, a rubber cap and a resin cap, are required as components to close a brush insertion hole of the brush holder portion. Moreover, the rubber cap is preliminarily attached to an inner side of the resin cap and the resin cap, to which the rubber cap is attached, is positioned with respect to the brush insertion hole of the brush holder portion. Then, after the rubber cap is fit to the brush insertion hole, the resin cap is fit in and attached to an engagement portion in an outer end portion of the brush insertion hole of the brush holder portion. Accordingly, the assembling work is extremely complicated.

SUMMARY OF THE INVENTION

The invention has an object to solve the problems above and provides a brush holder device of a vehicle AC generator in which mechanical strength of a plate is increased and with which assembling performance is enhanced by making a mechanism that closes a brush insertion hole of a brush holder portion simpler.

A brush holder device of a vehicle AC generator according to one aspect of the invention includes: a regulator circuit that adjusts magnitude of an AC voltage generated in a stator; a base that is made of resin, attached within a rear bracket, and formed by integrally molding a brush holder portion having a brush insertion hole and holding a brush within the brush insertion hole and a regulator circuit housing portion in which the regulator circuit is housed and held; a cap that is made of resin and has sufficient elasticity to close the brush insertion hole; and a plate that is made of metal, integrally has the cap made of resin, and is attached to the brush holder portion.

With the brush holder device of a vehicle AC generator configured as above, because the plate is made of metal, not only does it become possible to increase the mechanical strength, but it also becomes possible to prevent deterioration of a fixation strength as a fastening torque of fixation screws or the like becomes poor due to the occurrence of depletion of resin as in the related art even when high temperature conditions continue. Consequently, there can be achieved an advantage that the brush holder device becomes more reliable. Further, by integrally attaching the cap that closes the brush insertion hole to the plate, there can be achieved an advantage that not only can the number of components be reduced, but also the assembling performance can be enhanced.

The foregoing and other objects features, aspects, and advantages of the present invention will become more apparent from the following detailed description of the present invention when taken in conjunction with the accompanying drawings.

DESCRIPTION OF THE PREFERRED EMBODIMENTS

Figure 1:
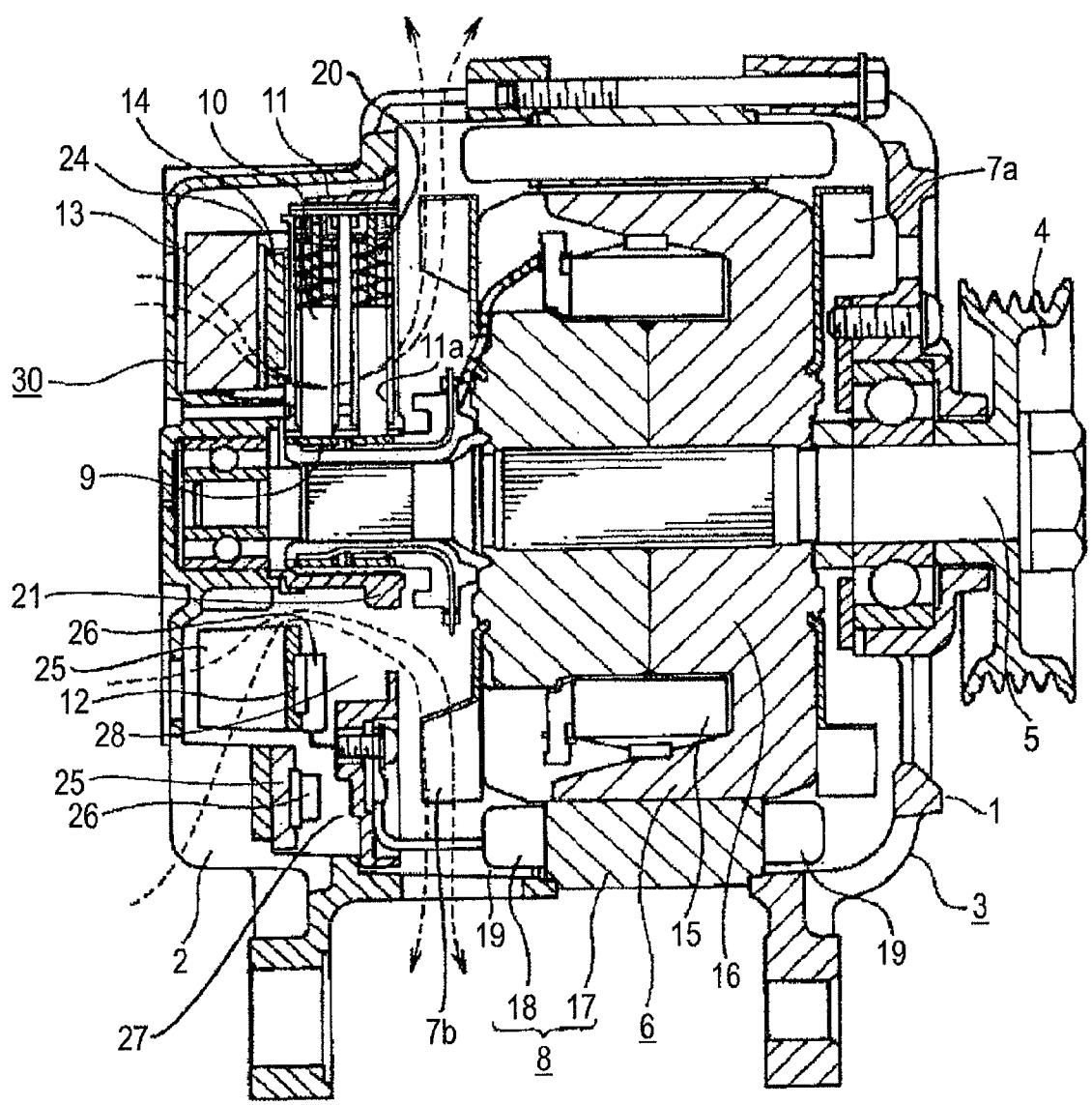
FIG. 1 is a cross section showing an overall, configuration of a vehicle AC generator having a brush holder device according to a first embodiment of the invention.

Hereinafter, embodiments of the invention will be described with reference to the drawings. Descriptions will be given by labeling like components with like reference numerals in respective drawings.

First Embodiment

FIG. 1 is a cross section of a vehicle AC generator having a brush holder device according to a first embodiment of the invention.

Referring to FIG. 1, the vehicle AC generator includes, as a base configuration, a case 3 formed of a front bracket 1 and a rear bracket 2 both made of aluminum, a rotation shaft 5 provided within the case 3 and having a pulley 4 fixed at one end, a claw-pole rotor 6 fixed to the rotation shaft 5, cooling fans 7a and 7b fixed to the rotor 6 on both end faces in an axial direction, a stator iron core 17 fixed within the case 3, and a stator coil 18 housed in a slot of the stator iron core 17.

Also, a slip ring 9 supplying the rotor 6 with a current is fixedly attached to the other end of the rotation shaft 5. A pair of brushes 10 is held in brush insertion holes 11a of a brush holder portion 11 provided on an outer periphery of the slip ring 9 so that the brushes 10 slide on the slip ring 9. Further, within the rear bracket 2, the vehicle AC generator further has a rectifier 12 that rectifies an AC generated in the stator coil 18 into a DC, a heat sink 13 fit in and attached to the brush holder portion 11, a regulator circuit 14 attached to the heat sink 13 and adjusting an AC voltage generated in the stator coil 18, and a regulator circuit housing portion 24 in which the regulator circuit 14 is housed.

Figure 3:
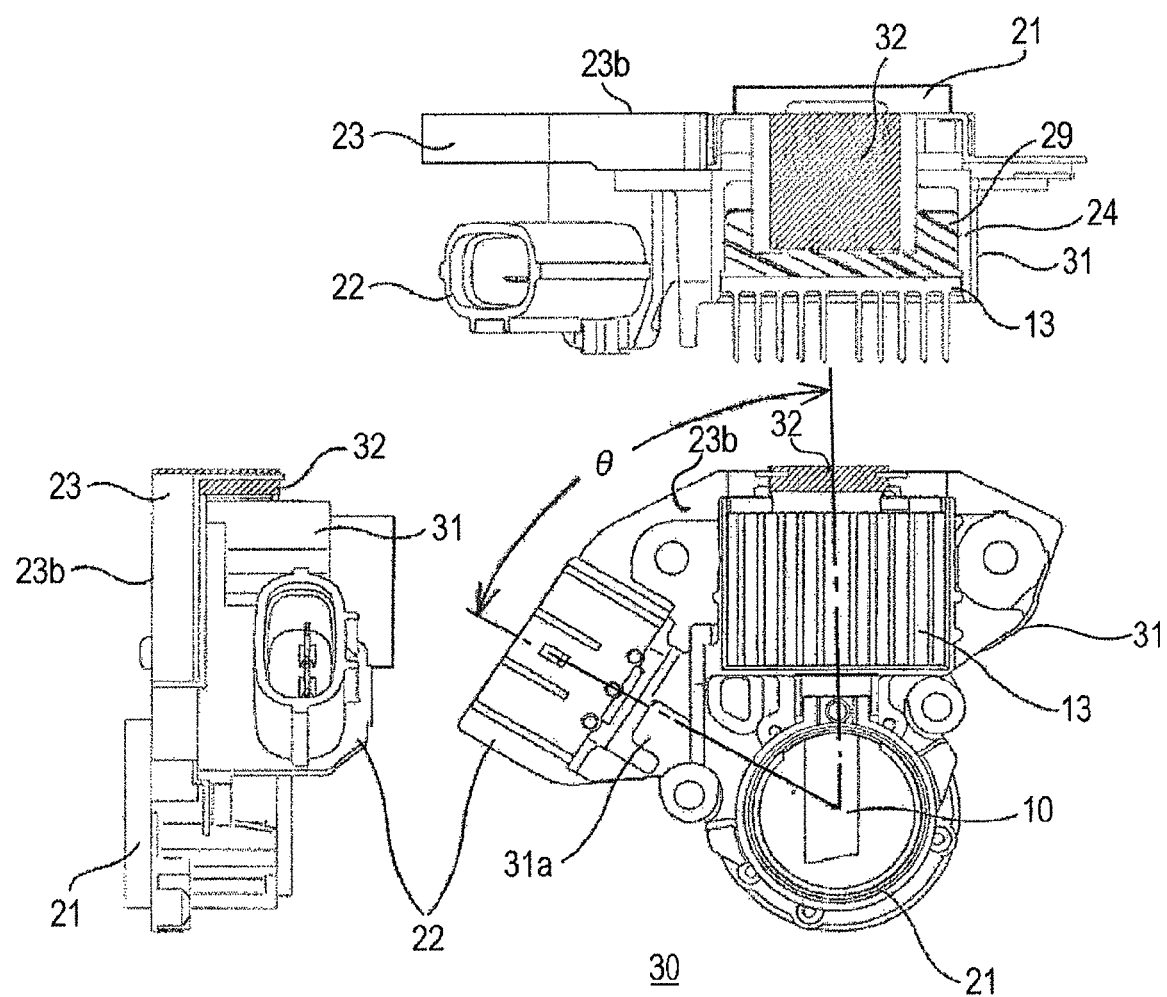
FIG. 3 is a three-view drawing showing a front view, a top view, and a left side view of the brush holder assembly employed in the vehicle AC generator according to the first embodiment of the invention.
Figure 4:
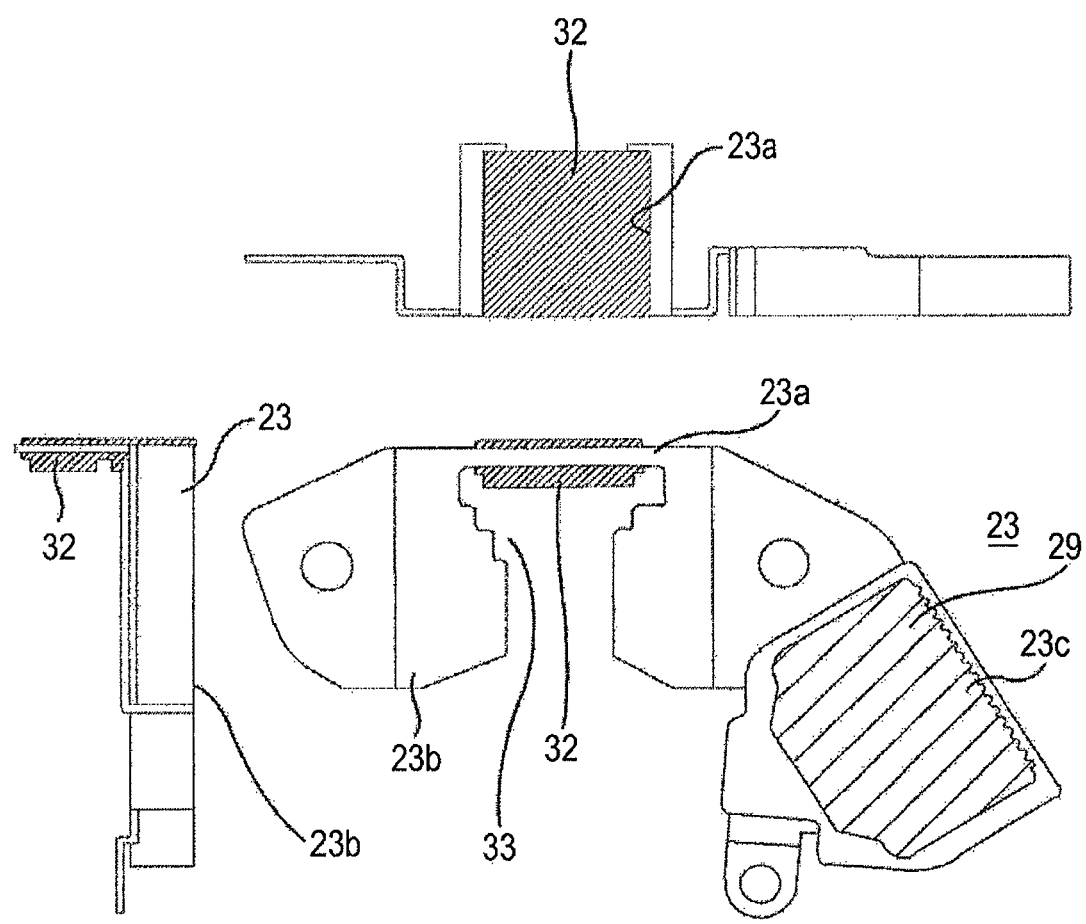
FIG. 4 is a three-view drawing showing a front view, a top view, and a left side view of a plate forming the brush holder assembly employed in the vehicle AC generator according to the first embodiment of the invention.
Figure 5:
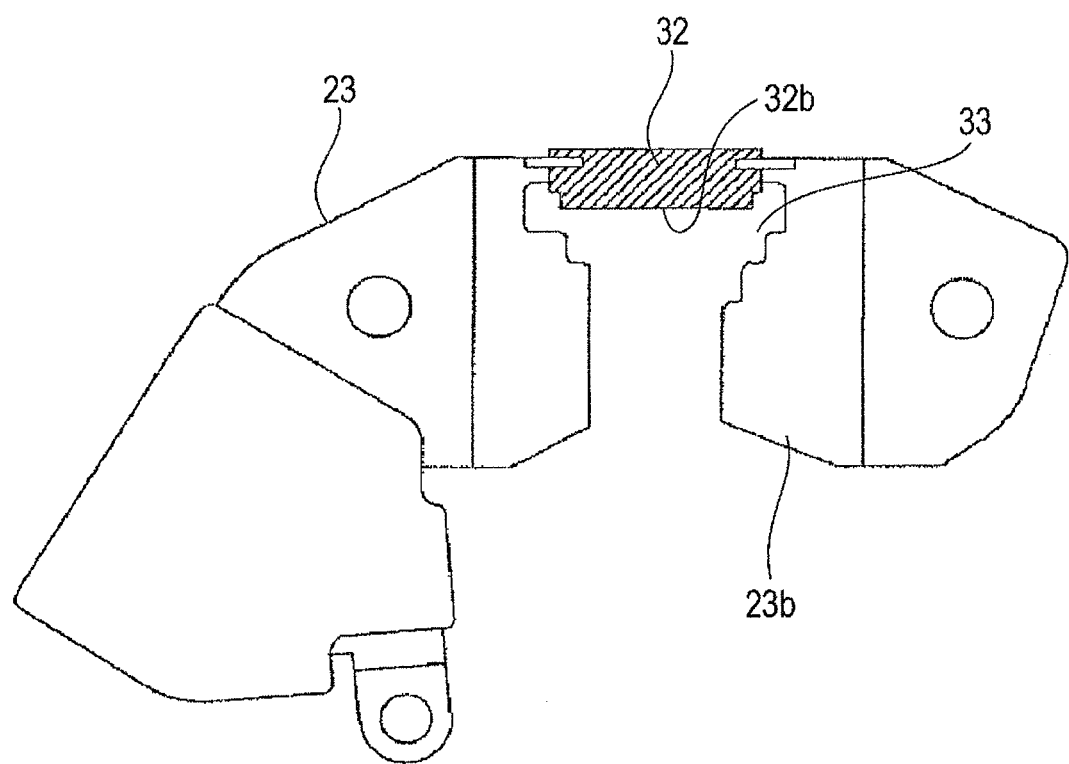
FIG. 5 is a view showing a back surface of the plate shown in FIG. 4.
Figure 6:
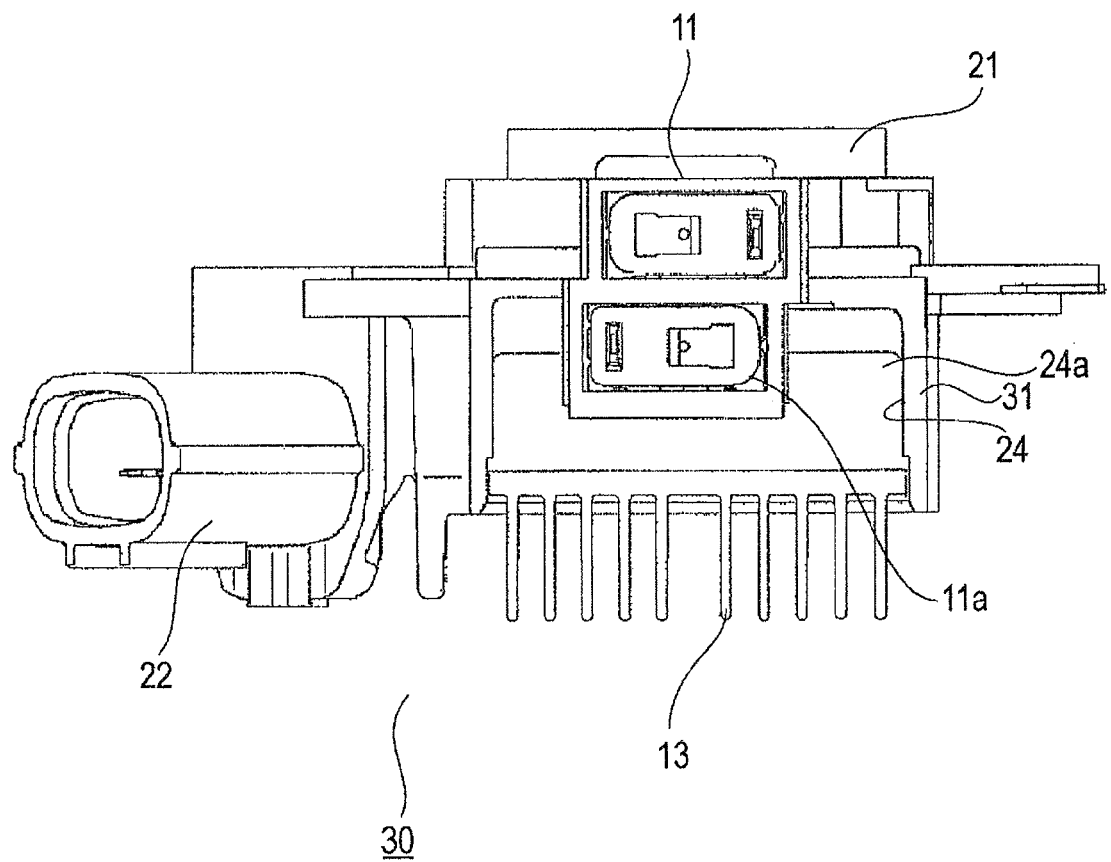
FIG. 6 is a top view in which the plate is omitted from the brush holder assembly described in the first embodiment of the invention.

The stator 8 is formed of the stator iron core 17 through which a rotating field induced by the rotor 6 passes and the stator coil 18 in which an AC output current generated by the rotating field flows. The stator coil 18 forms coil ends 19 at both ends of the stator iron core 17 in an axial direction. Also, as is shown in FIG. 3, a connector portion 22, to which an unillustrated external plug is attached, is provided in the vicinity of the regulator circuit 14. The brushes 10, the brush holder portion 11, the connector portion 22, the regulator circuit housing portion 24, and the like together form a brush holder assembly 30. A plate 23 made of metal described in detail below is attached to the brush holder portion 11.

The brush holder assembly 30 will now be described with reference to FIG. 1 through FIG. 7.

Figure 2:
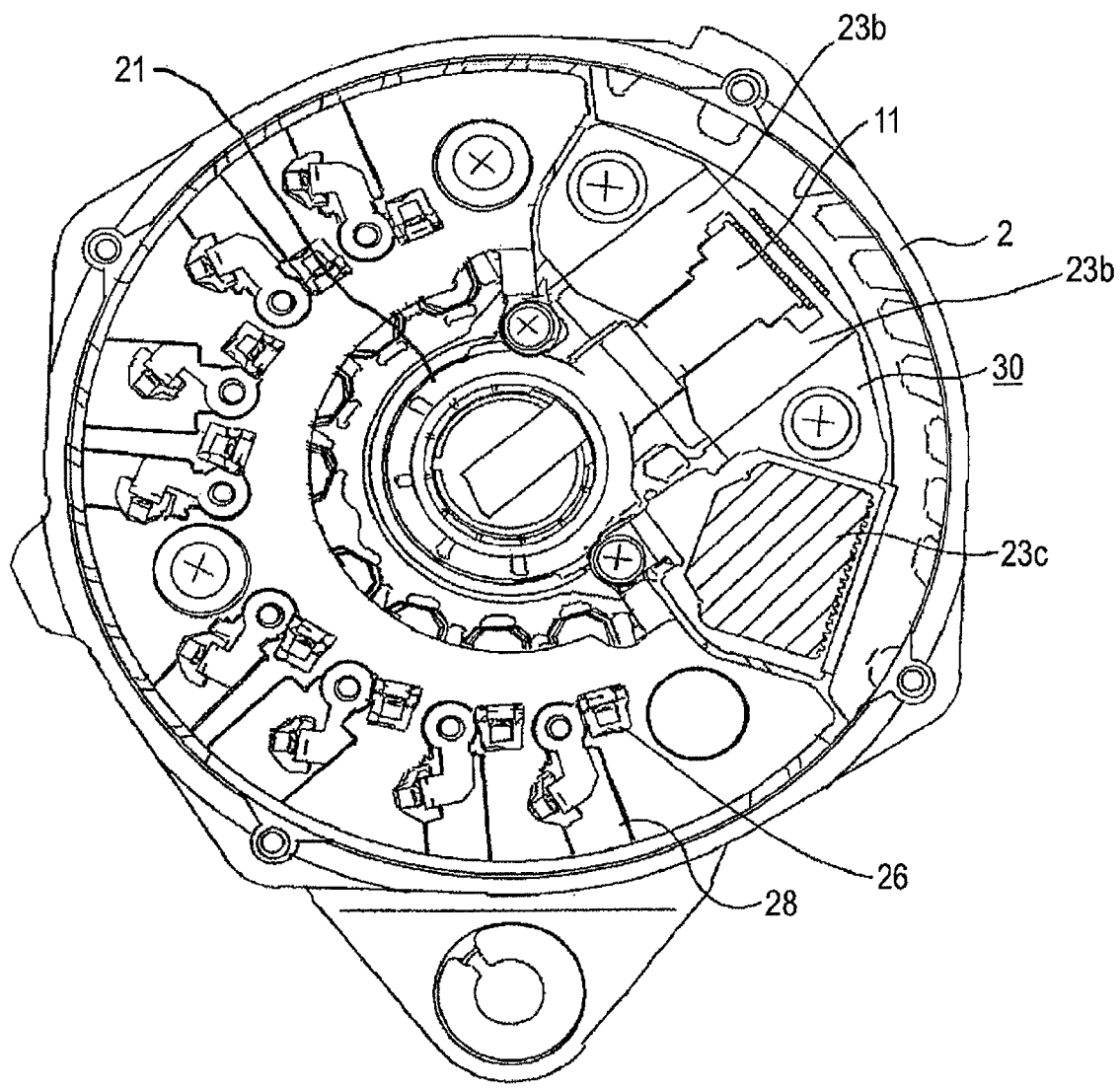
FIG. 2 is a front view showing an attachment state of a rectifier and a brush holder assembly in the vehicle AC generator according to the first embodiment of the invention.

The brush holder assembly 30 includes a base 31 formed by integrally molding the brush holder portion 11, the connector portion 22, the regulator circuit housing portion 24, and a slinger portion 21 of a cylindrical shape using, for example, polyphenylene sulfide (PPS) resin, and the plate 23 (23b) made of metal and attached to the brush holder portion 11 in a re-attachable manner (FIG. 2,3). As is shown in FIG. 2 and also as is described in Patent Document 1 specified above, the slinger portion 21 is disposed in such a manner that a shaft center thereof coincides with a shaft center of the rotation shaft 5. Hence, a direction perpendicular to the shaft center of the slinger portion 21 is given as a radial direction.

As is obvious from FIG. 2, the brush holder portion 11 is provided so as to extend radially from an outer peripheral surface of the slinger portion 21. The brush insertion holes 11a (FIG. 1) are formed within the brush holder portion 11 to face the slinger portion 21 while being spaced apart in a direction of the shaft center of the slinger portion 21. The regulator circuit housing portion 24 is disposed next to the brush holder portion 11 so as to overlap the brush holder portion 11 on one side of the brush holder portion 11 in the direction of the shaft center of the slinger portion 21. The connector portion 22 is provided within a plane including both of the regulator circuit housing portion 24 and the brush holder portion 11 and traversing the rotation shaft 5 at a right angle at a position (FIG. 3) rotated by a certain angle θ in a circumferential direction with respect to the regulator circuit housing portion 24 and the brush holder portion 11 with an opening portion oriented outward. A vent hole 31a (FIG. 3) is drilled in the brush holder portion 11 of the base 31 on one side in the circumferential direction.

The regulator circuit 14 is housed in the regulator circuit housing portion 24 that is fixedly attached to the heat sink 13 having plural fins from an opening on one side in the direction of the shaft center of the slinger portion 21 and held therein (FIG. 1). Insulating resin 29 is filled in the regulator circuit housing portion 24 from a resin inlet 24a (FIG. 6) opening in the regulator circuit housing portion 24 on the outer side in the radial direction. The brushes 10 are inserted into the respective brush insertion holes 11a of the brush holder portion 11 and pressed toward the slinger portion 21 with a pushing force of a spring 20.

Figure 7:
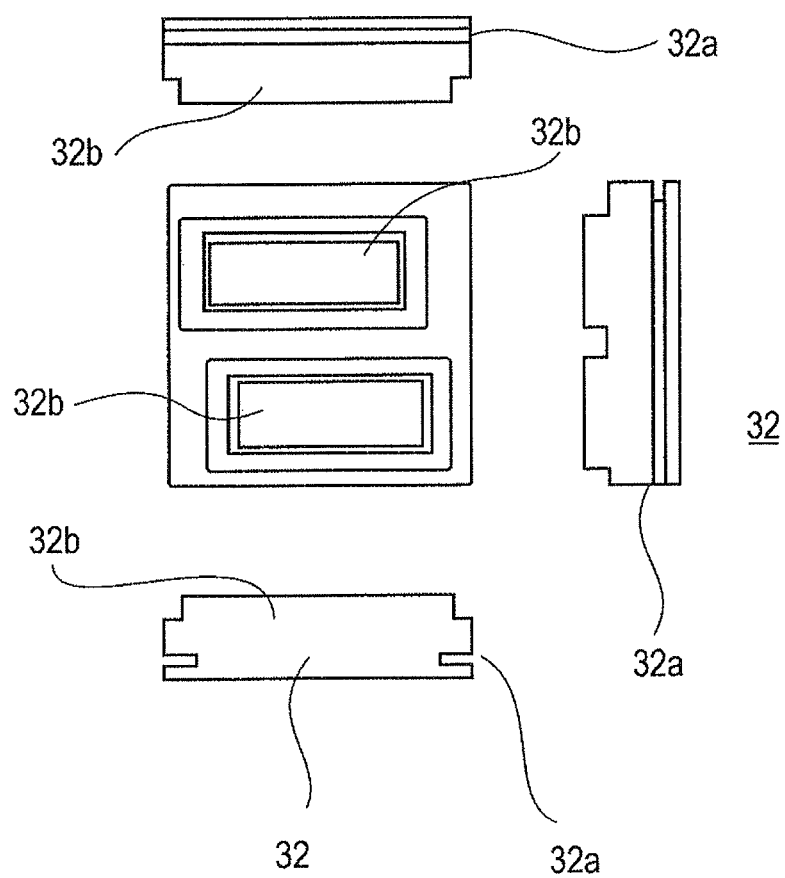
FIG. 7 is a four-view drawing showing a front view, a top view, a bottom view, and a right side view of a cap made of rubber in the brush holder assembly described in the first embodiment of the invention.

The cap 32 closing the brush insertion holes 11a is made of rubber and, as is shown in FIG. 7, has a fitting portion 32a fit in and attached to a locking portion 23a (FIG. 4) of the plate 23 and closing portions 32b inserted in the respective brush insertion holes 11a and closing these insertion holes 11a. The plate 23 is formed by press-molding an iron plate and has a current plate portion 23b having a flat plane on the surface and the locking portion 23a (FIG. 4) provided so as to extend upright from the current plate portion 23b and formed of substantially a square frame surrounding the resin inlet 24a of the regulator circuit housing portion 24. Also, the plate 23 is provided with a capacitor housing portion 23c formed so as to recess at one end of the current plate portion 23b, and a noise preventing capacitor (not shown) is housed in this capacitor housing portion 23c. The capacitor housing portion 23c is filled with the filling resin 29 (FIG. 4) so as to embed the capacitor (not shown).

The plate 23 is provided with a fitting portion 33 (FIG. 4) to the brush holder portion 11 in the vicinity of a base portion of the locking portion 23a of the current plate portion 23b. A part of an inner shape of the fitting portion 33 forms a step so as to conform to an outer shape of a radial upper end portion of the brush holder portion 11. The plate 23 is attached to the base 31 by fitting the fitting portion 33 in the brush holder portion 11 to be attached thereto. Consequently, the brush holder portion 11 and the current plate portion 23b are located substantially flush with each other and thereby form a flat plane as a whole.

An attachment state of the rectifier assembly 28 and the brush holder assembly 30 will now be described. As are shown in FIG. 1 and FIG. 2, the rectifier 12 is fabricated by disposing two substantially C-shaped heat sinks 25, on each of which plural diodes 26 are mounted, concentrically within the same plane, and by placing a substantially C-shaped circuit board 27 on the heat sinks 25. The diodes 26 mounted on the heat sinks 25 are connected by the circuit board 27 so as to form a rectifier circuit. The rectifier 12 is then combined with the circuit board 27 to form the rectifier assembly 28 (for details, see Patent Document 1 specified above).

The rectifier assembly 28 is disposed in an arc shape about the shaft center of the rear bracket 2 and fastened fixedly onto an inner diameter surface of the rear bracket 2. Although it is not shown in the drawings, a positioning portion that positions the connector portion 22 is provided to an inner wall surface of the rear bracket 2 between substantially C-shaped end faces of the rectifier assembly 28. In addition, a large air inlet hole is drilled into the inner wall surface so as to oppose the heat sink 13 of the regulator circuit 14.

The brush holder assembly 30 is disposed between the substantially C-shaped end faces of the rectifier assembly 28 by bringing the shaft center of the slinger portion 21 into coincidence with the shaft center of the rear bracket 2 and fixedly fastened to the inner wall surface of the rear bracket 2. Consequently, the surface of the current plate portion 23b is located flush with the rectifier assembly 28 with respect to a surface opposing blades of the cooling fan 7b and thereby forms a flat ring-like blade opposing surface.

As has been described, according to the brush holder device of the first embodiment, the plate 23 is made of metal by molding an iron plate by predetermined pressing, and formed of the current plate portion 23b having a flat plane on the surface and the locking portion 23a provided so as to extend upright from the current plate portion 23b and formed of a frame of substantially a square shape surrounding the resin inlet 24a of the regulator circuit housing portion 24. The cap 32 made of rubber is first attached to the plate 23 by fitting the cap 32 to the locking portion 23a forming a frame body of substantially a square shape. Then, the fitting portion 33 of the plate 23, to which the cap 32 made of rubber is attached, is fixedly attached to the brush holder portion 11 by fitting the fitting portion 33 into the step-like outer shape portion of the brush holder portion 11 in the axial direction.

In this instance, the cap 32 together with the frame body of the plate 23 is bent slightly in a direction so as to open radially outward and inserted into an opening outer periphery of the brush insertion holes 11a of the brush holder portion 11. Then, by depressing the cap 32 so as to close the brush insertion holes 11a of the brush holder portion 11, the closing portions 32b of the cap 32 are inserted into the brush insertion holes 11a and the brush insertion holes 11a are closed.

Consequently, the brush insertion holes 11a are sealed with the cap 32.

Hence, according to the brush holder device according to the first embodiment of the invention, because the plate 23 that is fit in and attached to the brush holder portion 11 is formed of an iron plate, it becomes possible to set mechanical strength higher than that of a plate made of resin as in the related art.

Also, even when the vehicle AC generator is run continuously under severe high temperature conditions, depletion of resin occurring in the related art does not occur. Hence, a fastening torque of the fixation screws or the like can be maintained and fixation becomes sufficient. Consequently, an operation becomes more reliable.

Further, a component to close the brush insertion holes 11a of the brush holder portion 11 is formed of the cap 32 made of rubber and the plate 23 to which the cap 32 is fit and attached. It thus becomes possible to reduce the number of components in comparison with those necessary in the related art. Further, when the plate 23, in which the cap 32 made of rubber is preliminarily fit in and attached to the locking portion 23a of the plate 23, is attached to the brush holder portion 11, the cap 32 can close the brush insertion holes 11a at the same time. Hence, assembling can be extremely simple.

Second Embodiment

A second embodiment shown in FIG. 8 through FIG. 12 will now be described.

Figure 8:
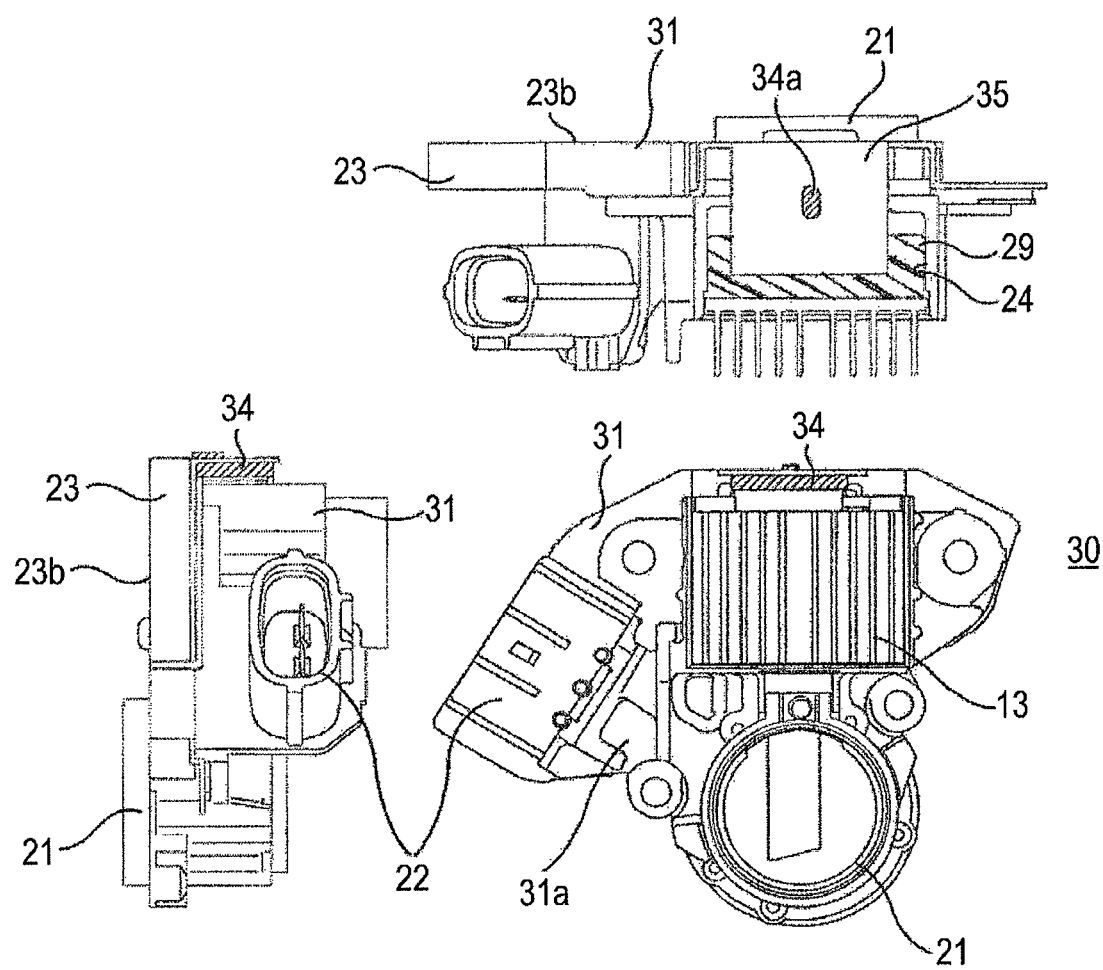
FIG. 8 is a three-view drawing showing a front view, a top view, and a left side view of a brush holder assembly employed in a vehicle AC generator according to a second embodiment of the invention.
Figure 9:
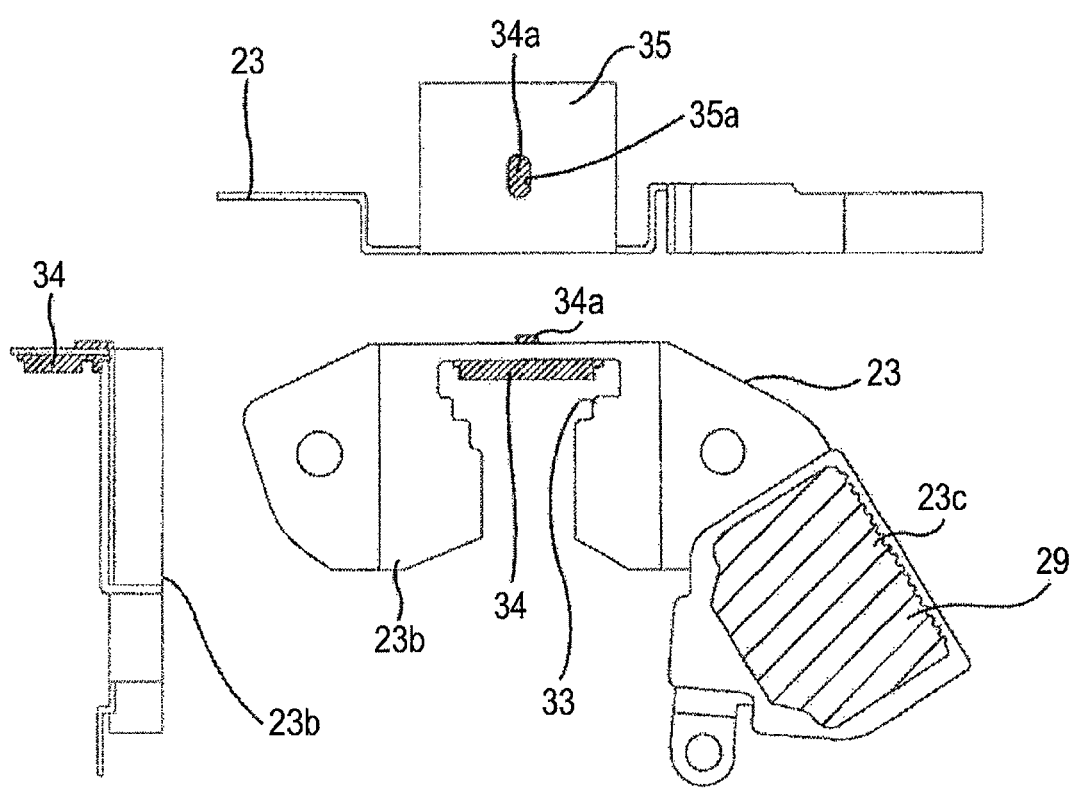
FIG. 9 is a three-view drawing showing a front view, a top view, and a left side view of a plate forming the brush holder assembly employed in the vehicle AC generator according to the second embodiment of the invention.
Figure 10:
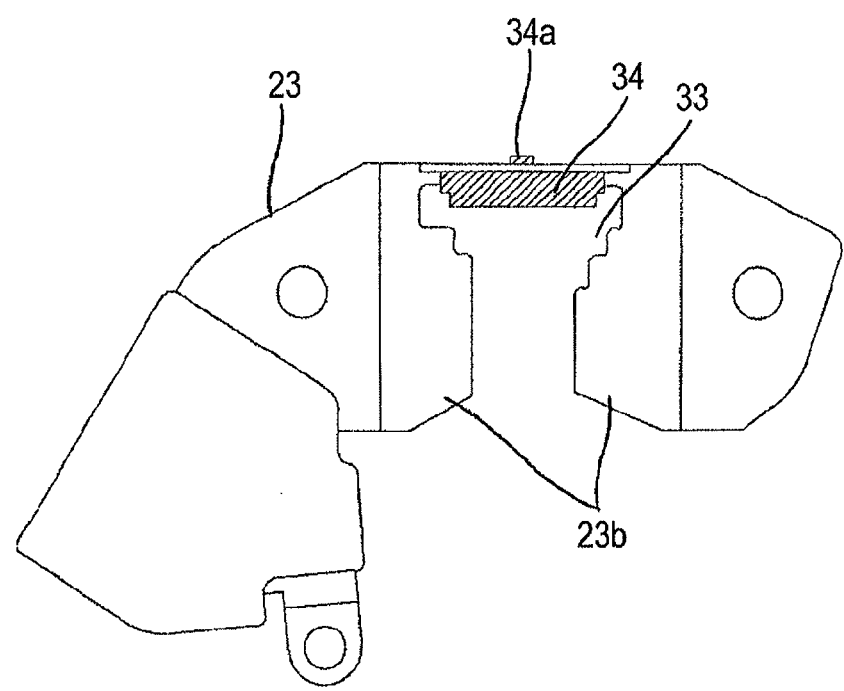
FIG. 10 is a view showing a back surface of the plate shown in FIG. 9.
Figure 11:
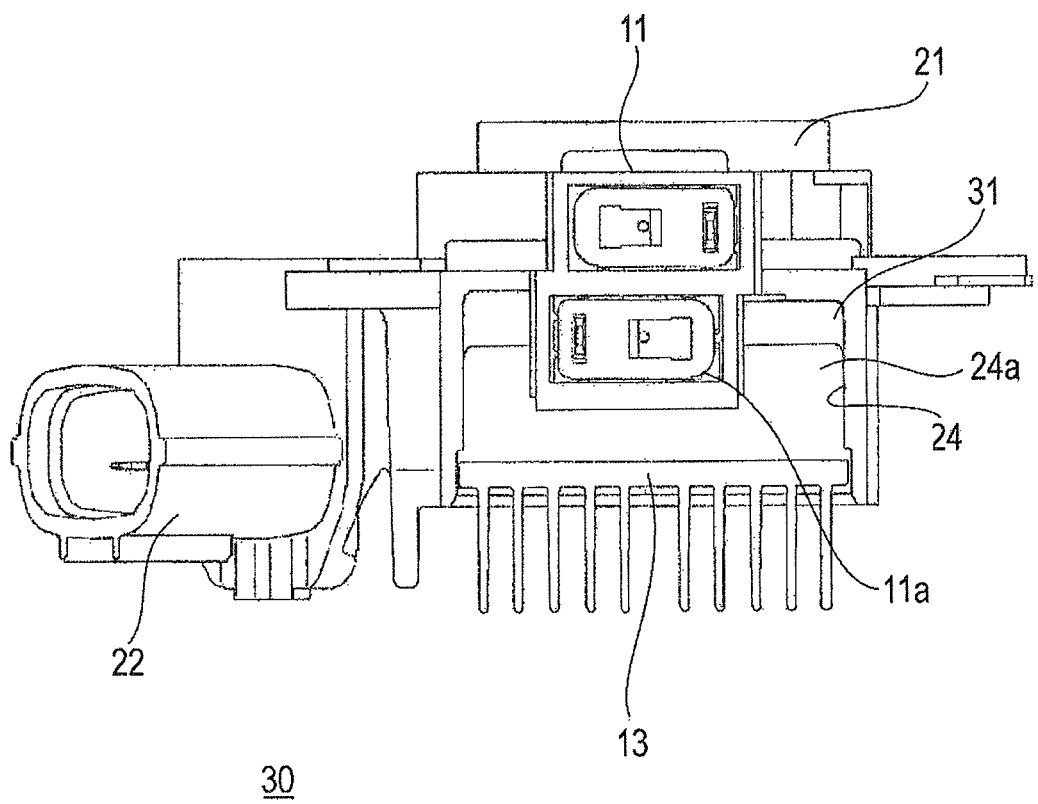
FIG. 11 is a top view in which the plate is omitted from the brush holder assembly described in the second embodiment of the invention.
Figure 12:
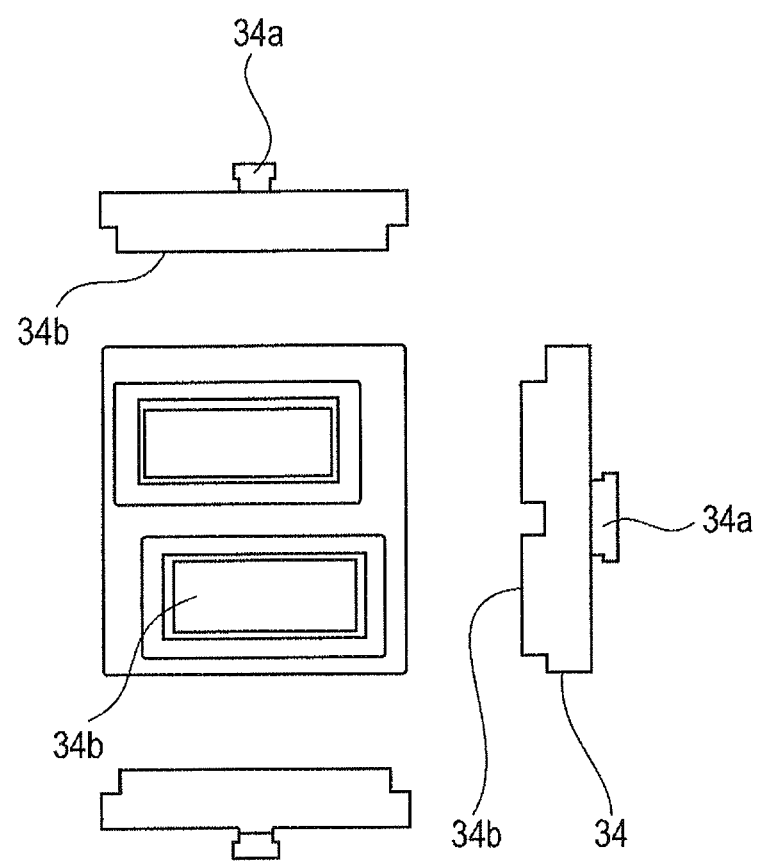
FIG. 12 is a four-view drawing showing a front view, a top view, a bottom view, and a right side view of a cap made of rubber in the brush holder assembly described in the second embodiment of the invention.

FIG. 8 is a three-view drawing showing a front view, a top view, and a left side view of an example of another configuration of the brush holder assembly 30. FIG. 9 is a three-view drawing showing a front view, a top view, and a left side view of a plate 23 forming the brush holder assembly 30. FIG. 10 is a view showing a back surface of the plate 23 shown in FIG. 9. FIG. 11 is a top view of the brush holder assembly 30 from which the plate 23 is omitted. FIG. 12 is a four-view drawing showing a front view, a top view, a bottom view, and a right side view of a cap made of rubber in the brush holder assembly 30.

Referring to FIG. 8 and FIG. 9, numeral 35 denotes a cover portion of substantially a square shape that is provided so as to extend upright from the plate 23 with respect to the current plate portion 23b and covers the resin inlet 24a (FIG. 11) of the regulator circuit housing portion 24. The cover portion 35 is formed by press-molding an iron plate and is provided with a locking hole 35a (FIG. 9) of an elliptical shape when viewed from above at substantially a center portion of the cover portion 35.

Numeral 34 denotes a cap made of rubber and having a protrusion portion 34a that is fit in and attached to the locking hole 35a to be locked therein and closing portions 34b (FIG. 12) that are inserted into the respective brush insertion holes 11a to close the insertion holes 11a.

As has been described, according to the brush holder device of the second embodiment, the protrusion portion 34a of the cap 34 made of rubber is preliminarily attached to the plate 23 by inserting the protrusion portion 34a into the locking hole 35a of the cover portion 35 of the plate 23. Then, when the fitting portion 33 of the plate 23 is attached to the fitting portion of the brush holder portion 11 in the axial direction, the cover portion 35 and the cap 34 are inserted first while slightly bending the both to open radially outward. Then, the cover portion 35 and the closing portions 34b of the cap 34 are depressed, so that the closing portions 34b are inserted into the respective brush insertion holes 11a and thereby close the insertion holes 11a. Consequently, the brush insertion holes 11a are sealed by the cap 34.

Hence, according to the brush holder device of the second embodiment, the cover portion 35 of the plate 23 made of iron and formed in substantially a square shape is provided so as to extend from the current plate portion 23b. Hence, it becomes possible to set further higher mechanical strength to the cover portion 35 and the more reliable brush holder assembly 30 can be formed. Also, the cap 34 can be attached to the plate 23 by merely inserting the protrusion portion 34a of the cap 34 into the locking hole 35a of the cover portion 35. Hence, the cap 34 can be readily attached to the plate 23.

While the above has described a case where the connector portion 22 forming the brush holder assembly 30 is provided at a position displaced by a predetermined angle in the circumferential direction with respect to the brush holder portion 11 by way of example. However, by providing the connector portion 22 on a radially outer peripheral side of the regulator circuit housing portion 24, the circumferential installment area of the brush holder assembly 30 can be reduced, and in turn, the circumferential installment area of the rectifier assembly 28 can be increased. Hence, there can be achieved a splendid advantage that a contribution can be made to an enhancement of an output by increasing the installment area and hence enhancing cooling performance.

Also, while the above has described a case where the noise preventing capacitor (not shown) is housed and held in the plate 23 forming the brush assembly holder 30 by way of example. However, by providing the capacitor (not shown) also at a position on the radially outer side of the regulator circuit housing portion 24, it becomes possible to further increase the circumferential installment area of the rectifier assembly 28.

Various modifications and alterations of this invention will be apparent to those skilled in the art without departing from the scope and spirit of this invention, and it should be understood that this is not limited to the illustrative embodiments set forth herein.

What is claimed is:

1. A brush holder device of a vehicle AC generator, comprising:
    a regulator circuit that adjusts magnitude of an AC voltage generated in a stator;
    a base that is attached within a rear bracket and formed by integrally molding a brush holder portion having a brush insertion hole and holding a brush within the brush insertion hole and a regulator circuit housing portion in which the regulator circuit is housed and held;
    a plate that is attached on the brush holder portion, and formed of a current plate portion having a flat plane on a surface and a cover portion provided so as to extend upright from the current plate portion and to close a resin inlet of the regulator circuit housing portion; and
    a cap that is formed integrally with the plate and made of rubber to close the brush insertion hole.

2. The brush holder device of a vehicle AC generator according to claim 1, wherein:
    the plate is formed of an iron plate, and the cover portion is provided with a locking portion which is formed of a frame surrounding the resin inlet of the regulator circuit housing portion to close the cap.

3. The brush holder device of a vehicle AC generator according to claim 2, wherein:
    the cap is formed of a fitting portion that is fit in and attached to the locking portion of the cover portion and a closing portion that is inserted into the brush insertion hole to close the brush insertion hole.

4. The brush holder device of a vehicle AC generator according to claim 1, wherein:
    the cover portion is formed in a square shape by press-molding an iron plate and is provided with a locking hole provided in a part of the cover portion to be locked therein.

5. The brush holder device of a vehicle generator according to claim 4, wherein:
    the cap has a protrusion portion that is fit to and is attached to a locking hole and a closing portion that is inserted into the brush insertion hole to close the brush insertion hole.

* * * * *